United States Patent
Nakada et al.

(10) Patent No.: US 6,843,109 B2
(45) Date of Patent: Jan. 18, 2005

(54) BARYCENTRIC POSITION MEASURING APPARATUS

(75) Inventors: Masato Nakada, Asaka (JP); Koji Oguma, Fujisawa (JP)

(73) Assignee: Tanita Corporation, Tokyo (JP)

( * ) Notice: Subject to any disclaimer, the term of this patent is extended or adjusted under 35 U.S.C. 154(b) by 0 days.

(21) Appl. No.: 10/727,591

(22) Filed: Dec. 5, 2003

(65) Prior Publication Data

US 2004/0168507 A1 Sep. 2, 2004

(30) Foreign Application Priority Data

Mar. 13, 2003 (JP) .................................. 2003-068255

(51) Int. Cl.⁷ .............................................. G01M 1/00
(52) U.S. Cl. ............................................... 73/65.01
(58) Field of Search .......................... 73/65.01, 65.06, 73/65.09

(56) References Cited

U.S. PATENT DOCUMENTS

| 5,276,432 A | 1/1994 | Travis |
|---|---|---|
| 2002/0050411 A1 | 5/2002 | Kusumoto et al. |

FOREIGN PATENT DOCUMENTS

| JP | 57163826 | 10/1982 | | |
|---|---|---|---|---|
| JP | 7-250822 | 10/1995 | | |
| JP | 7-250823 | 10/1995 | | |
| JP | 07250824 A | * 10/1995 | ............ | A61B/5/11 |
| JP | 08215176 A | * 8/1996 | ............ | A61B/5/11 |

* cited by examiner

Primary Examiner—Edward Lefkowitz
Assistant Examiner—T Miller
(74) Attorney, Agent, or Firm—McDermott Will & Emery LLP

(57) ABSTRACT

The apparatus receives a load by a load receiving board, selects and switches a combination of a first sensor and a second sensor, a combination of the second sensor and a third sensor, a combination of the third sensor and a fourth sensor and a combination of the fourth sensor and the first sensor in turn by selection switching means, obtains output differences of all these combinations selected and switched in turn by the selection switching means in output difference conversion means 14, stores in a memory the output differences obtained in the output difference conversion means, determines in a barycentric position computation section a first directional position (position Gy with respect to the y coordinate axis) and a second directional position (position Gx with respect to the x coordinate axis) based on comparisons of the output differences stored in the memory, and outputs the positions in output means.

8 Claims, 7 Drawing Sheets

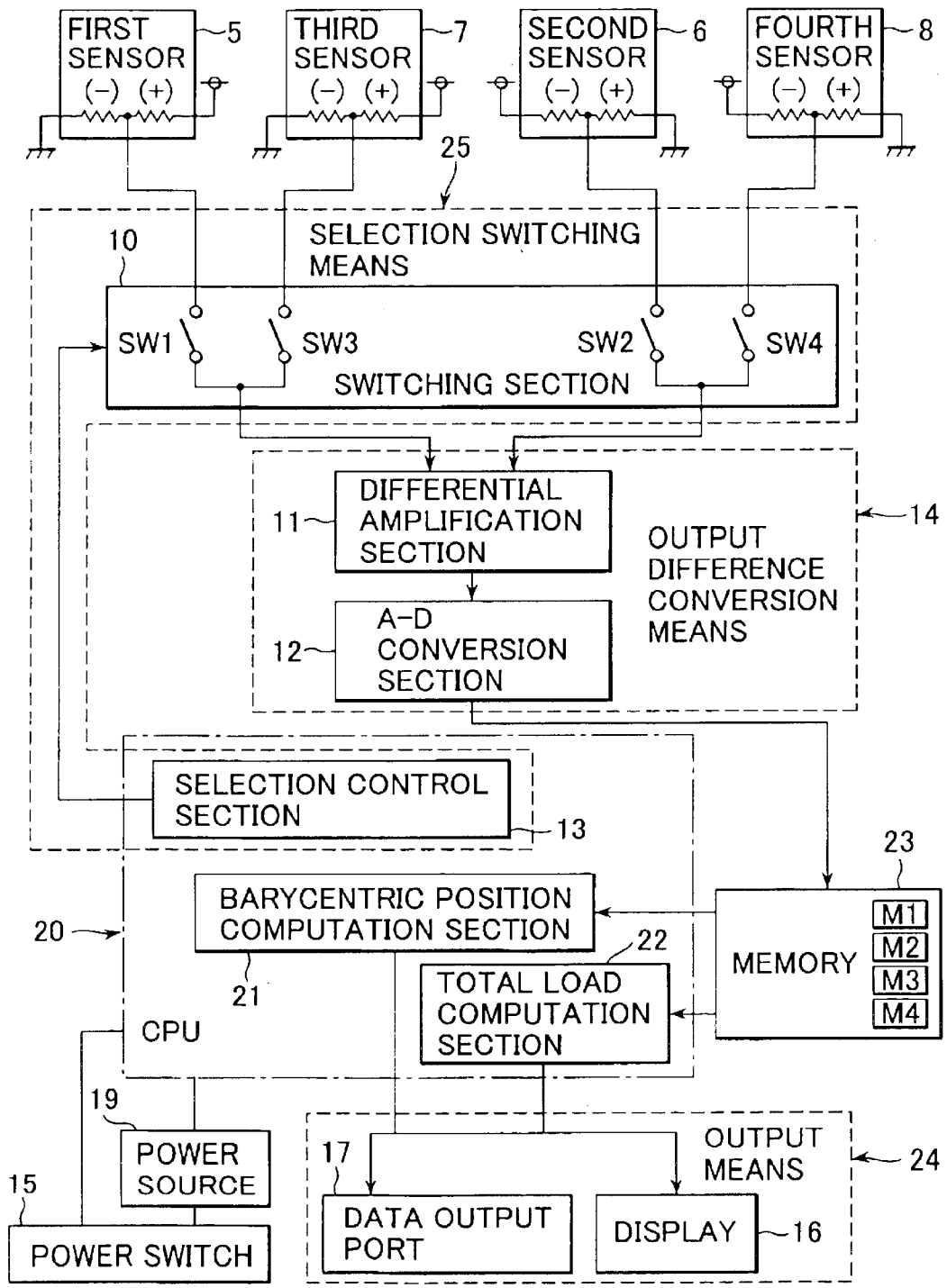

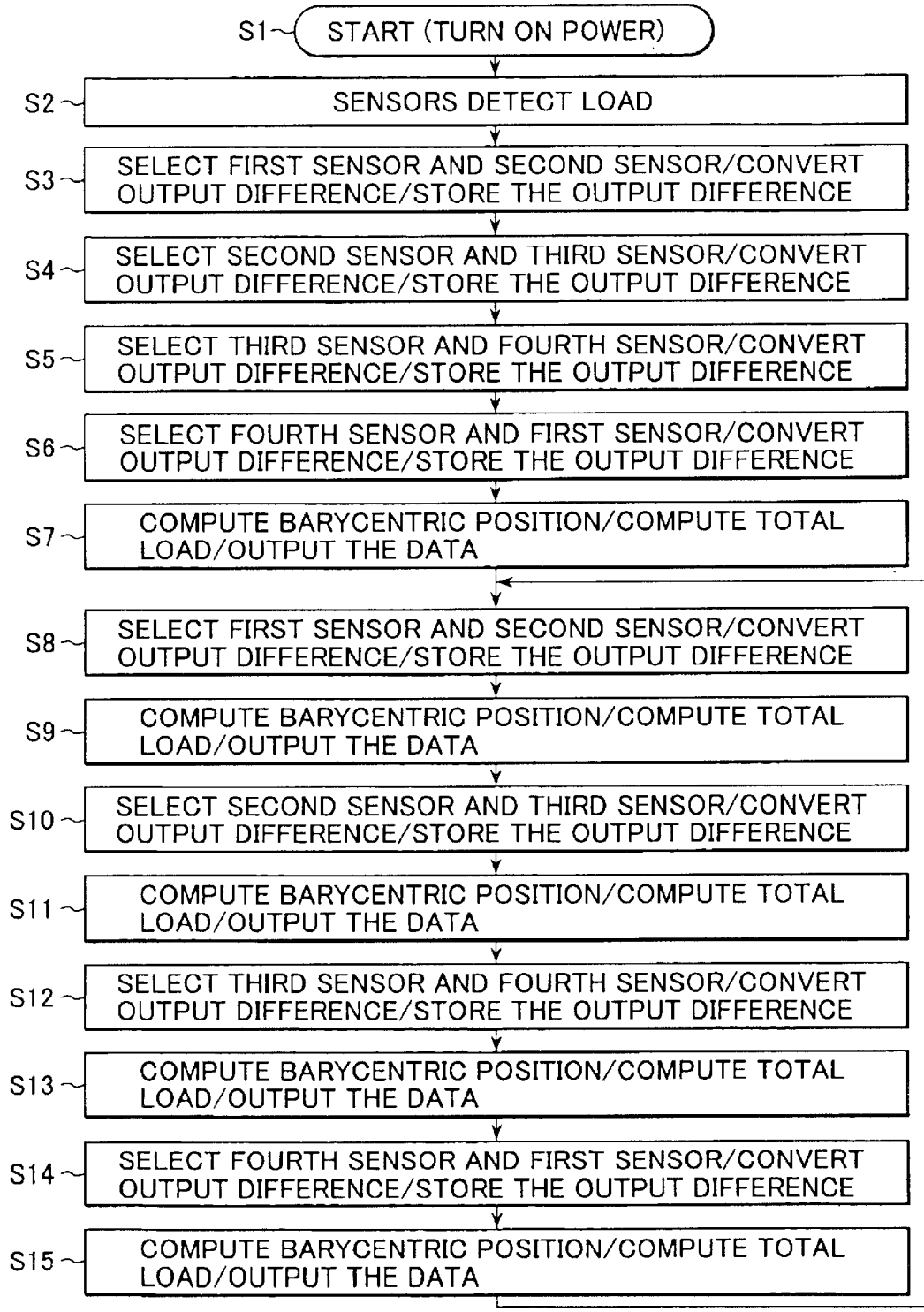

BARYCENTRIC POSITION MEASURING APPARATUS

BACKGROUND OF THE INVENTION (i) Field of the Invention

The present invention relates to a barycentric position measuring apparatus which measures the barycentric position of a load when the load is applied to a load receiving board.

(ii) Description of the Related Art

A conventional barycentric position measuring apparatus which measures the barycentric position of a load when the load is applied to a load receiving board, as shown in a plan view in FIG. 7(a) showing the external appearance of the apparatus and a front view in FIG. 7(b) showing the external appearance of the apparatus, has a plurality of sensors 101, 102, 103 and 104 disposed at (x1, y1), (x2, y2), (x3, y3) and (x4, y4) so that a load is passed from a load receiving board 100, amplifies outputs w1, w2, w3 and w4 from the sensors 101, 102, 103 and 104 in turn, and calculates the barycentric position (Gx, Gy) of a load when the load is applied to the load receiving board 100 by use of the following expressions 3 and 4.

$$Gx=(w1 \times x1+w2 \times x2+w3 \times x3+w4 \times x4)/(w1+w2+w3+w4) \quad (3)$$

$$Gy=(w1 \times y1+w2 \times y2+w3 \times y3+w4 \times y4)/(w1+w2+w3+w4) \quad (4)$$

For example, a barycenter fluctuation meter as described in Patent Publication 1 and Patent Publication 2 as a kind of barycentric position measuring apparatus generally calculates a barycentric position in the manner as described above. Patent Publication 1

Japanese Patent Application Laid-Open No. 250822/1995
Patent Publication 2

Japanese Patent Application Laid-Open No. 250823/1995

However, the above barycentric position measuring apparatus has a problem that if the barycentric position of a load applied to the load receiving board 100 is displaced when the outputs w1, w2, w3 and w4 from the sensors 101, 102, 103 and 104 are amplified in turn, all changes in the outputs from the sensors which are caused by the displacement affect both the barycentric position Gx with respect to the x coordinate axis and the barycentric position Gy with respect to the y coordinate axis, thereby making calculation of an accurate barycentric position impossible.

Further, to obtain a high resolution for improvement of accuracy, the apparatus requires use of high-output sensors or amplifiers which greatly amplify outputs from sensors. Such sensors and amplifiers have a problem of being expensive due to their high performance.

Thus, an object of the present invention is to solve the above problems of the prior art and provide an inexpensive barycentric position measuring apparatus which measures a barycentric position accurately.

SUMMARY OF THE INVENTION

To achieve the above object, a barycentric position measuring apparatus of the present invention comprises:
a load receiving board,
a first sensor and a third sensor,
a second sensor and a fourth sensor,
selection switching means,
output difference conversion means,
a memory,
a barycentric position computation section, and
output means,
wherein
the load receiving board receives a load,
the first sensor and the third sensor are disposed at opposing two corners out of the four corners of the load receiving board so that the load is passed from the load receiving board and output a positive output,
the second sensor and the fourth sensor are disposed at the other opposing two corners out of the four corners of the load receiving board so that the load is passed from the load receiving board and output a negative output,
the selection switching means selects and switches a combination of the positive output from the first sensor and the negative output from the second sensor, a combination of the negative output from the second sensor and the positive output from the third sensor, a combination of the positive output from the third sensor and the negative output from the fourth sensor, and a combination of the negative output from the fourth sensor and the positive output from the first sensor, the output difference conversion means determines the output differences of all the combinations selected and switched by the selection switching means,
the memory stores the output differences determined by the output difference conversion means,
the barycentric position computation section determines a first directional position based on a comparison of the data stored in the memory, i.e., a comparison of the output difference between the positive output from the first sensor and the negative output from the second sensor with the output difference between the positive output from the third sensor and the negative output from the fourth sensor and also determines a second directional position orthogonal to the first directional position based on a comparison of the data stored in the memory, i.e., a comparison of the output difference between the negative output from the second sensor and the positive output from the third sensor with the output difference between the negative output from the fourth sensor and the positive output from the first sensor, and
the output means outputs the first directional position and second directional position determined by the barycentric position computation section.

Further, the selection switching means selects and switches a combination of the positive output from the first sensor and the negative output from the second sensor, a combination of the negative output from the second sensor and the positive output from the third sensor, a combination of the positive output from the third sensor and the negative output from the fourth sensor, and a combination of the negative output from the fourth sensor and the positive output from the first sensor in turn.

Further, the selection switching means selects and switches a combination of the positive output from the first sensor and the negative output from the second sensor, a combination of the positive output from the third sensor and the negative output from the fourth sensor, a combination of the negative output from the second sensor and the positive output from the third sensor, and a combination of the negative output from the fourth sensor and the positive output from the first sensor in turn.

Further, the barycentric position computation section computes a barycentric position (Gx, Gy) with respect to the x and y coordinate axes by substituting:
(x1, y1) which is the position of the first sensor with respect to the x and y coordinate axes, (x2, y2) which is the position of the second sensor with respect to the x and y coordinate axes,
(x3, y3) which is the position of the third sensor with respect to the x and y coordinate axes,
(x4, y4) which is the position of the fourth sensor with respect to the x and y coordinate axes,
wM1 which is the output difference between the positive output from the first sensor and the negative output from the second sensor,
wM2 which is the output difference between the negative output from the second sensor and the positive output from the third sensor,
wM3 which is the output difference between the positive output from the third sensor and the negative output from the fourth sensor, and
wM4 which is the output difference between the negative output from the fourth sensor and the positive output from the first sensor,
into the following expressions 5 and 6.

$$Gx=[\{(x2+x3)/2\} \times wM2\} - \{(x1+x4)/2\} \times wM4\}]/(wM2+wM4) \quad (5)$$

$$Gy=[\{(y1+y2)/2\} \times wM1\} - \{(y3+y4)/2\} \times wM3\}]/(wM1+wM3) \quad (6)$$

Further, the barycentric position measuring apparatus further comprises a total load computation section which totals all the output differences stored in the memory so as to determine a total load.

BRIEF DESCRIPTION OF THE DRAWINGS

FIG. 1 is a block diagram showing the sections of the electrical system of a barycentric position measuring apparatus according to the present invention.

FIG. 3 is a flowchart showing a flow of operations of the sections of the barycentric position measuring apparatus according to the present invention.

DETAILED DESCRIPTION OF THE PREFERRED EMBODIMENTS

Hereinafter, an embodiment of the present invention will be described by use of the drawings.

Figure 2A:
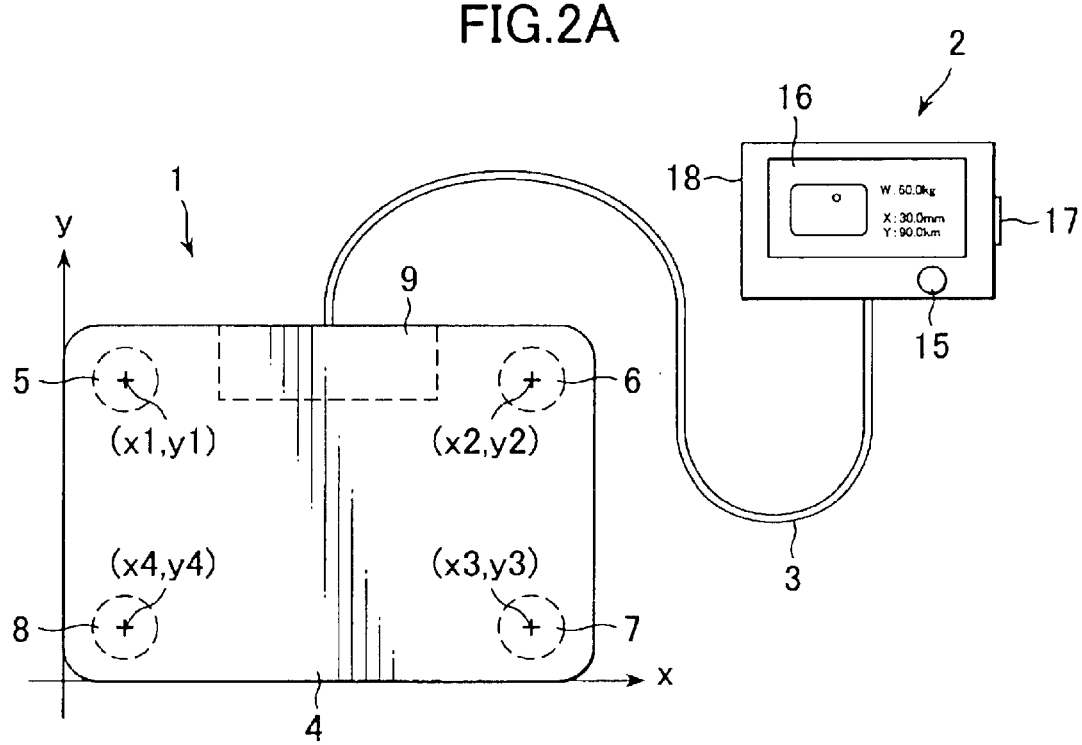
FIG. 2(a) is a plan view of the external appearance of the barycentric position measuring apparatus according to the present invention.
Figure 2B:
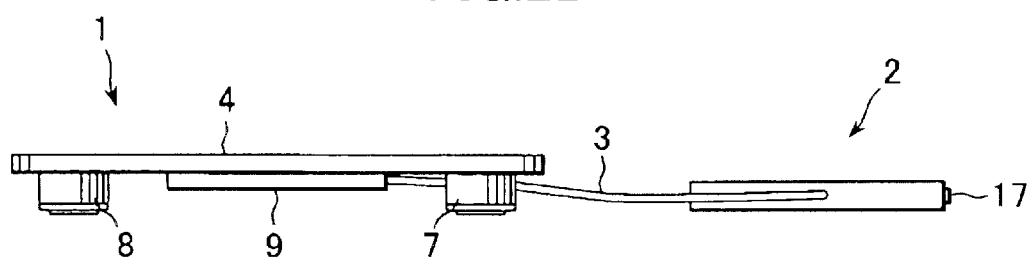
FIG. 2(b) is a front view of the external appearance of the barycentric position measuring apparatus according to the present invention.

Firstly, the constitution of a barycentric position measuring apparatus according to the present invention will be described in detail with reference to a block diagram showing constituents of the electrical system in FIG. 1, a plan view showing the external appearance of the apparatus in FIG. 2(a), and a front view showing the external appearance of the appearance in FIG. 2(b).

The barycentric position measuring apparatus of the present invention comprises a main unit 1, a display box 2, and a cord 3 which connects the main unit 1 to the display box 2.

The main unit 1 comprises a load receiving board 4 which receives a load, four sensors (first sensor 5, second sensor 6, third sensor 7 and fourth sensor 8) which are provided near the four corners of the load receiving board 4, and a board unit 9 which is provided near a side of the load receiving board 4.

The four sensors (first sensor 5, second sensor 6, third sensor 7 and fourth sensor 8) have a half-bridge strain gauge as a load-electricity conversion device. Of the four sensors (first sensor 5, second sensor 6, third sensor 7 and fourth sensor 8), two sensors (first sensor 5 and third sensor 7) which are positioned at opposing corners convert a positive load passed from the load receiving board 4 into an electrical positive output when the board 4 receives the load (i.e., the positive load is applied to the board 4). Meanwhile, the remaining two sensors (second sensor 6 and fourth sensor 8) which are positioned at opposing corners convert a positive load passed from the load receiving board 4 into an electrical negative output when the board 4 receives the load (i.e., the positive load is applied to the board 4).

The board unit 9 is connected to the four sensors. The unit 9 takes in outputs from these four sensors, processes the outputs by an electronic board having a switching section 10, a differential amplification section 11 and an A-D conversion section 12, and then outputs the data to a cord 3.

The switching section 10 switches on and off Sw1, SW2, SW3 and SW4 based on a signal from a selection control section 13 which will be described later so as to switch a combination of a positive output from the first sensor 5 and a negative output from the second sensor 6, a combination of a negative output from the second sensor 6 and a positive output from the third sensor 7, a combination of a positive output from the third sensor 7 and a negative output from the fourth sensor 8 and a combination of a negative output from the fourth sensor 8 and a positive output from the first sensor 5 in turn and output the data.

The differential amplification section 11 determines a difference between the two outputs combined in the switching section 10. The A-D conversion section 12 converts the output difference (in analog form) determined in the differential amplification section 11 into a digital form. The differential amplification section 11 and the A-D conversion section 12 together constitute output difference conversion means 14.

The display box 2 has a power switch 15, a display 16 and a data output port 17 on the external surface of a case 18, and the box 2 also has a power source 19 and an electronic board having a CPU (including the selection control section 13, a barycentric position computation section 21 and a total load computation section 22) 20 and a memory 23 in the case 18.

The power switch 15 switches between supplying power to the sections of the electrical system and stopping supply of the power thereto. The power source 19 supplies power to the sections of the electrical system when the power switch 15 is switched on.

The display 16 displays the results of measurements of a barycentric position and a total load and other data. The data output port 17 outputs data to external devices such as a personal computer. The display 16 and the data output port 17 together constitute output means 24.

In addition to serving as the selection control section 13, the barycentric position computation section 21 and the total load computation section 22, the CPU 20 controls the sections of the electrical system and performs computations in a known manner.

The selection control section 13 controls the switching section 10 to select and switch in turn among a combination of a positive output from the first sensor 5 and a negative output from the second sensor 6, a combination of a negative output from the second sensor 6 and a positive output from the third sensor 7, a combination of a positive output from the third sensor 7 and a negative output from the fourth sensor 8 and a combination of a negative output from the fourth sensor 8 and a positive output from the first sensor 5. The switching section 10 and the selection control section 13 together constitute selection switching means 25.

The barycentric position computation section 21 determines a first directional position (position Gy with respect to the y coordinate axis) based on a comparison of data stored in the memory 23, i.e., a comparison of a difference between the positive output from the first sensor 5 and the negative output from the second sensor 6 with a difference between the positive output from the third sensor 7 and the negative output from the fourth sensor 8. Further, it also determines a second directional position (position Gx with respect to the x coordinate axis) which is orthogonal to the first directional position based on a comparison of a difference between the negative output from the second sensor 6 and the positive output from the third sensor 7 with a difference between the negative output from the fourth sensor 8 and the positive output from the first sensor 5.

The total load computation section 22 totals the output differences of all combinations of outputs stored in the memory 23.

The memory 23 has a plurality of storage areas (M1, M2, M3, M4 and so on) so as to store output differences of all combinations which have been digitized in the A-D conversion section 12 and data at the time of various processes in a known manner.

Next, the operations (operations in measurement of a barycentric position when a subject to be measured stands on the load receiving board 4 in the same manner as of a scale or a barycenter fluctuation meter) of the barycentric position measuring apparatus according to the present invention will be described in detail with reference to a flowchart in FIG. 3 showing a flow of operations of the sections.

When the power switch 15 is switched on, the power source 19 supplies power to the sections of the electrical system, whereby the sections of the apparatus are activated (STEP S1).

Then, when a subject to be measured stands on the load receiving board 4, i.e., a load is applied to the board 4, the four sensors (first sensor 5, second sensor 6, third sensor 7 and fourth sensor 8) receives the load. The first sensor 5 and the third sensor 7 convert the loads that they have received into electrical positive outputs (voltages), and the second sensor 6 and the fourth sensor 8 convert the loads that they have received into electrical negative outputs (voltages) (STEP S2).

Then, the selection control section 13 causes the switching section 10 to switch on SW1 and SW2 and switch off SW3 and SW4 by sending a signal to the switching section 10. Upon receipt of the signal, the switching section 10 switches on SW1 and SW2 and switches off SW3 and SW4, whereby the first sensor 5 and the second sensor 6 are connected to the differential amplification section 11. The differential amplification section 11 then differential-amplifies the positive output of the first sensor 5 and the negative output of the second sensor 6 and outputs a difference between the positive output of the first sensor 5 and the negative output of the second sensor 6. Then, the A-D conversion section 12 converts the difference (in analog form) between the outputs of the first sensor 5 and the second sensor 6 into a digital form. Then, the memory 23 stores the digitized output difference wM1 between the outputs of the first sensor 5 and the second sensor 6 in M1 (STEP S3).

Then, the selection control section 13 causes the switching section 10 to switch on SW3 and SW2 and switch off SW1 and SW4 by sending a signal to the switching section 10. Upon receipt of the signal, the switching section 10 switches on SW3 and SW2 and switches off SW1 and SW4, whereby the third sensor 7 and the second sensor 6 are connected to the differential amplification section 11. The differential amplification section 11 then differential-amplifies the positive output of the third sensor 7 and the negative output of the second sensor 6 and outputs a difference between the positive output of the third sensor 7 and the negative output of the second sensor 6. Then, the A-D conversion section 12 converts the difference (in analog form) between the outputs of the third sensor 7 and the second sensor 6 into a digital form. Then, the memory 23 stores the digitized output difference wM2 between the outputs of the third sensor 7 and the second sensor 6 in M2 (STEP S4).

Then, the selection control section 13 causes the switching section 10 to switch on SW3 and SW2 and switch off SW1 and SW2 by sending a signal to the switching section 10. Upon receipt of the signal, the switching section 10 switches on Sw3 and SW4 and switches off SW1 and SW2, whereby the third sensor 7 and the fourth sensor 8 are connected to the differential amplification section 11. The differential amplification section 11 then differential-amplifies the positive output of the third sensor 7 and the negative output of the fourth sensor 8 and outputs a difference between the positive output of the third sensor 7 and the negative output of the fourth sensor 8. Then, the A-D conversion section 12 converts the difference (in analog form) between the outputs of the third sensor 7 and the fourth sensor 8 into a digital form. Then, the memory 23 stores the digitized output difference wM3 between the outputs of the third sensor 7 and the fourth sensor 8 in M3 (STEP S5).

Then, the selection control section 13 causes the switching section 10 to switch on SW1 and SW4 and switch off SW3 and SW2 by sending a signal to the switching section 10. Upon receipt of the signal, the switching section 10 switches on SW1 and SW4 and switches off SW3 and SW2, whereby the first sensor 5 and the fourth sensor 8 are connected to the differential amplification section 11. The differential amplification section 11 then differential-amplifies the positive output of the first sensor 5 and the negative output of the fourth sensor 8 and outputs a difference between the positive output of the first sensor 5 and the negative output of the fourth sensor 8. Then, the A-D conversion section 12 converts the difference (in analog form) between the outputs of the first sensor 5 and the fourth sensor 8 into a digital form. Then, the memory 23 stores the digitized output difference wM4 between the outputs of the first sensor 5 and the fourth sensor 8 in M4 (STEP S6).

Then, the barycentric position computation section 21 computes a barycentric position Gx with respect to the x coordinate axis by substituting the output difference wM2 stored in M2 of the memory 23, the output difference wM4 stored in M4 of the memory 23 and the positions (x1, x2, x3, x4) of the sensors with respect to the x coordinate axis into the following expression 7. Further, the barycentric position computation section 21 also computes a barycentric position Gy with respect to the y coordinate axis by substituting the output difference wM1 stored in M1 of the memory 23, the output difference wM3 stored in M3 of the memory 23 and the positions (y1, y2, y3, y4) of the sensors with respect to the y coordinate axis into the following expression 8.

$$Gx=[\{(x2+x3)/2\}\times wM2-\{(x1+x4)/2\}\times wM4]/(wM2+wM4) \quad (7)$$

$$Gy=[\{(y1+y2)/2\}\times wM1-\{(y3+y4)/2\}\times wM3]/(wM1+wM3) \quad (8)$$

Then, the total load computation section 22 totals the output difference wM1 stored in M1 of the memory 23, the output difference wM2 stored in M2 of the memory 23, the output difference wM3 stored in M3 of the memory 23 and the output difference wM4 stored in M4 of the memory 23 so as to compute a total load Wt which has been applied to the load receiving board 4.

Then, the display 16 displays the barycentric positions Gx and Gy computed in the barycentric position computation section 21 and the total load Wt computed in the total load computation section 22. Further, the data output port 17 outputs the barycentric positions Gx and Gy computed in the barycentric position computation section 21 and the total load Wt computed in the total load computation section 22, in the form of signals (STEP S7).

Then, a process similar to STEP S3 is carried out, and an output difference between the outputs of the first sensor 5 and the second sensor 6 is written over the data in M1 of the memory 23 (STEP S8).

Then, a process similar to STEP S7 is carried out, and the barycentric positions Gx and Gy and the total load Wt are computed, displayed, and output in the form of signals (STEP S9).

Then, a process similar to STEP S4 is carried out, and an output difference between the outputs of the second sensor 6 and the third sensor 7 is written over the data in M2 of the memory 23 (STEP S10).

Then, a process similar to STEP S7 is carried out, and the barycentric positions Gx and Gy and the total load Wt are computed, displayed, and output in the form of signals (STEP S11).

Then, a process similar to STEP S5 is carried out, and an output difference between the outputs of the third sensor 7 and the fourth sensor 8 is written over the data in M3 of the memory 23 (STEP S12).

Then, a process similar to STEP S7 is carried out, and the barycentric positions Gx and Gy and the total load Wt are computed; displayed, and output in the form of signals (STEP S13).

Then, a process similar to STEP S6 is carried out, and an output difference between the outputs of the fourth sensor 8 and the first sensor 5 is written over the data in M4 of the memory 23 (STEP S14).

Then, a process similar to STEP S7 is carried out, and the barycentric positions Gx and Gy and the total load Wt are computed, displayed, and output in the form of signals (STEP S15).

Then, STEP S8 and its subsequent steps are carried out repeatedly until the power switch 15 is switched off.

As described above, the barycentric position measuring apparatus of the present invention receives a load by means of the load receiving board 4. Two sensors (first sensor 5 and third sensor 7) out of the sensors provided near the four corners of the load receiving board 4 convert a load passed from the load receiving board 4 into a positive output, and the other two sensors (second sensor 6 and fourth sensor 8) convert the load passed from the load receiving board 4 into a negative output. In the selection switching means 25, a combination of the positive output from the first sensor 5 and the negative output from the second sensor 6, a combination of the negative output from the second sensor 6 and the positive output from the third sensor 7, a combination of the positive output from the third sensor 7 and the negative output from the fourth sensor 8 and a combination of the negative output from the fourth sensor 8 and the positive output from the first sensor 5 are selected and switched from one to another in turn. In the output difference conversion means 14, the output differences of all combinations of the outputs selected and switched from one to another in turn in the selection switching means 25 are determined. In the memory 23, the output differences determined in the output difference conversion means 14 are stored. In the barycentric position computation section 21, a first directional position (position Gy with respect to the y coordinate axis) is determined based on a comparison of the output differences stored in the memory 23, i.e., a comparison of the difference between the positive output from the first sensor 5 and the negative output from the second sensor 6 with the difference between the positive output from the third sensor 7 and the negative output from the fourth sensor 8; and a second directional position (position Gx with respect to the x coordinate axis) which is orthogonal to the first directional position is also determined based on a comparison of the difference between the negative output from the second sensor 6 and the positive output from the third sensor 7 with the difference between the negative output from the fourth sensor 8 and the positive output from the first sensor 5. In the total load computation section 22, all output differences stored in the memory 23 are totaled so as to determine a total load. In the output means 24, the first directional position and second directional position determined in the barycentric position computation section 21 and the total load determined in the total load computation section 22 are output.

According to the above constitution, the outputs of two sensors are sampled always simultaneously, and the barycentric position Gx with respect to the x coordinate axis or the barycentric position Gy with respect to the y coordinate axis is determined based on two out of the output differences of all combinations. Thus, the influence of changes in outputs from the sensors which are caused by the displacement of the barycentric position of a load applied to the load receiving board 4 is reduced to a half of that of the prior art, so that calculation of an accurate barycentric position becomes possible. Further, a difference between outputs from two sensors is determined from a positive output and a negative output. Thus, high outputs (high resolutions) can be obtained without use of sensors with especially high outputs or use of an amplification component capable of high degree of amplification, so that the accuracy of calculations of the barycentric position and the total load can be increased.

In the above embodiment, a combination of the positive output from the first sensor 5 and the negative output from the second sensor 6, a combination of the negative output from the 6 second sensor 6 and the positive output from the third sensor 7, a combination of the positive output from the third sensor 7 and the negative output from the fourth sensor 8, and a combination of the negative output from the fourth sensor 8 and the positive output from the first sensor 5 are selected and switched from one to another in the order presented by the selection switching means 25. This has an advantage that quick switching can be achieved because it is sufficient to merely switch only one of SW1, SW2, SW3 and SW4 of the switching section 10 in turn.

Figure 6:
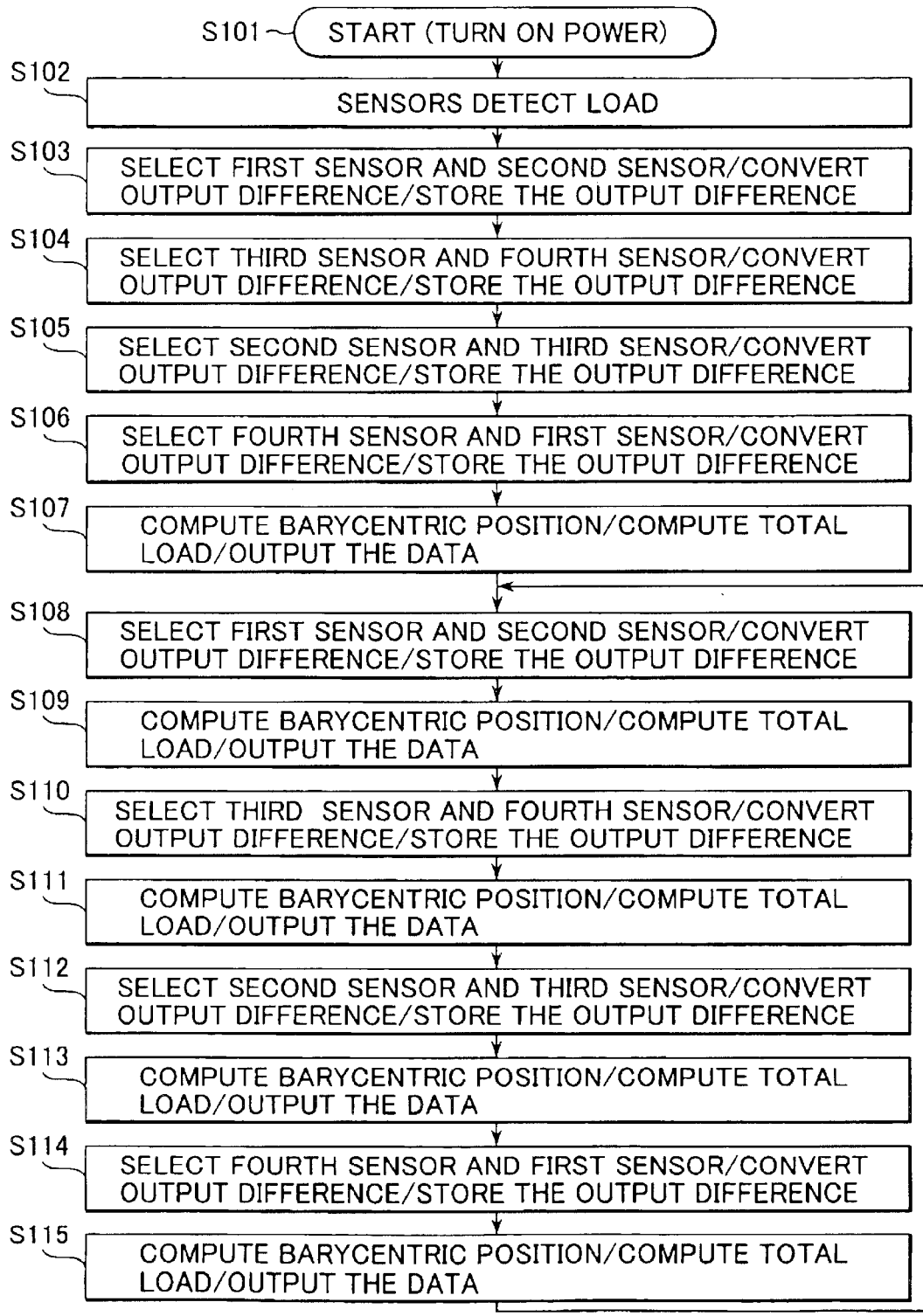
FIG. 6 is a flowchart showing another flow of operations of the sections.
Figure 7A:
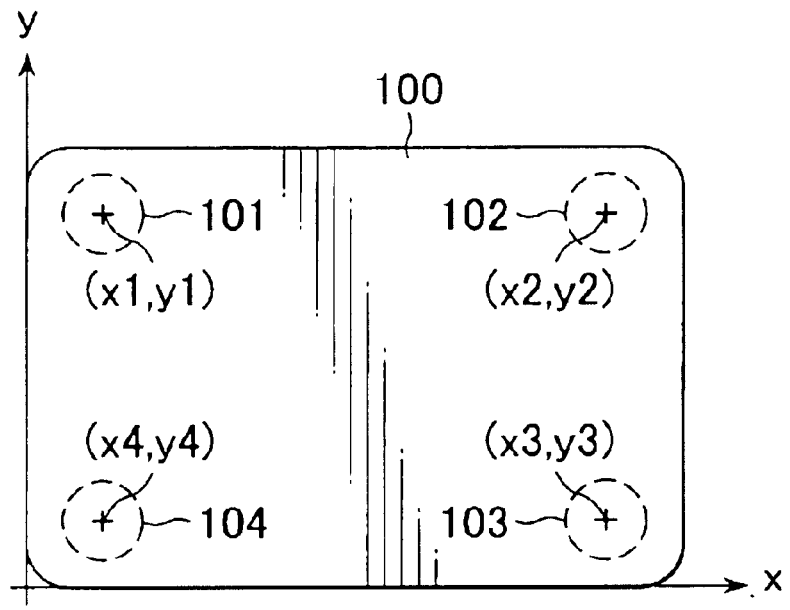
FIG. 7(a) is a plan view of the external appearance of a conventional barycentric position measuring apparatus.
Figure 7B:
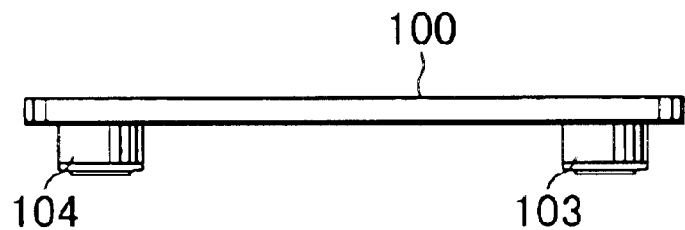
FIG. 7(b) is a front view of the external appearance of the conventional barycentric position measuring apparatus.

However, it is also acceptable to switch a combination of the positive output from the first sensor 5 and the negative output from the second sensor 6, a combination of the positive output from the third sensor 7 and the negative output from the fourth sensor 8, a combination of the negative output from the second sensor 6 and the positive output from the third sensor 7, and a combination of the negative output from the fourth sensor 8 and the positive output from the first sensor 5 from one to another in the order presented. In this case, in place of the flowchart of FIG. 3, the operations of the sections of the barycentric position measuring apparatus flow as shown in the flowchart of FIG. 6. This has an advantage that the influence of changes in outputs from the sensors which are caused by the displacement of the barycentric position of a load applied to the load receiving board 4 can be rendered small because combinations of the outputs from the sensors which are associated with the directional position with respect to the y coordinate axis (a combination of the outputs from the first sensor 5 and the second sensor 6 and a combination from the outputs of the third sensor 7 and the fourth sensor 8) can be switched from one to the other in the order presented and combinations of the outputs from the sensors which are associated with the directional position with respect to the x coordinate axis (a combination of the outputs from the second sensor 6 and the third sensor 7 and a combination of the outputs from the fourth sensor 8 and the first sensor 5) can be switched from one to the other in the order presented.

Further, in addition to the four sensors (first sensor 5, second sensor 6, third sensor 7 and fourth sensor 8) having a half-bridge strain gauge as a load-electricity conversion device which are used in the above embodiment, it is also acceptable to use four sensors (first sensor, second sensor, third sensor and fourth sensor) having a full-bridge strain gauge as a load-electricity conversion device.

Figure 4:
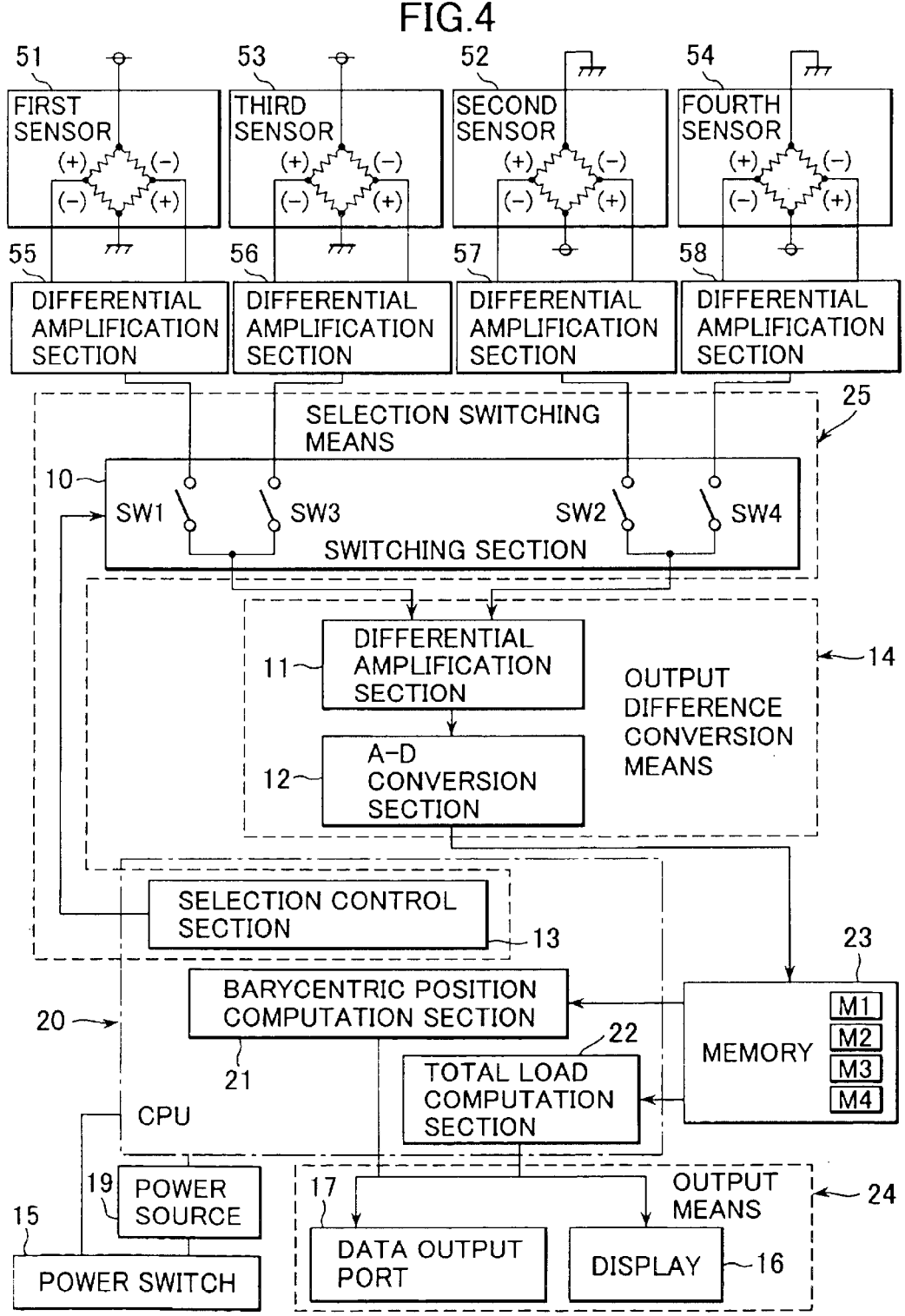
FIG. 4 is a block diagram showing the sections of another electrical system.

An example of the constitution in this case is shown in the block diagram of FIG. 4. In place of the four sensors (first sensor 5, second sensor 6, third sensor 7 and fourth sensor 8) in FIG. 1 which have a half-bridge strain gauge as a load-electricity conversion device, four sensors (first sensor 51, second sensor 52, third sensor 53 and fourth sensor 54) having a full-bridge strain gauge as a load-electricity conversion device and differential amplification sections 55, 56, 57 and 58 which differential-amplify outputs from the sensors are provided before a switching section 10.

Of the four sensors (first sensor 51, second sensor 52, third sensor 53 and fourth sensor 54) having a full-bridge strain gauge as a load-electricity conversion device, two sensors (first sensor 51 and third sensor 53) which are positioned at opposing corners convert a positive load passed from a load receiving board 4 into an electrical positive output when the board 4 receives the load (i.e., the positive load is applied to the board 4). Meanwhile, the remaining two sensors (second sensor 52 and fourth sensor 54) which are positioned at opposing corners convert a positive load passed from the load receiving board 4 into an electrical negative output when the board 4 receives the load (i.e., the positive load is applied to the board 4). Then, the outputs from the sensors are differential-amplified in the differential amplification sections 55, 56, 57 and 58 and output to the switching section 10. Then, the same operations as those shown in FIG. 1 are performed.

Figure 5:
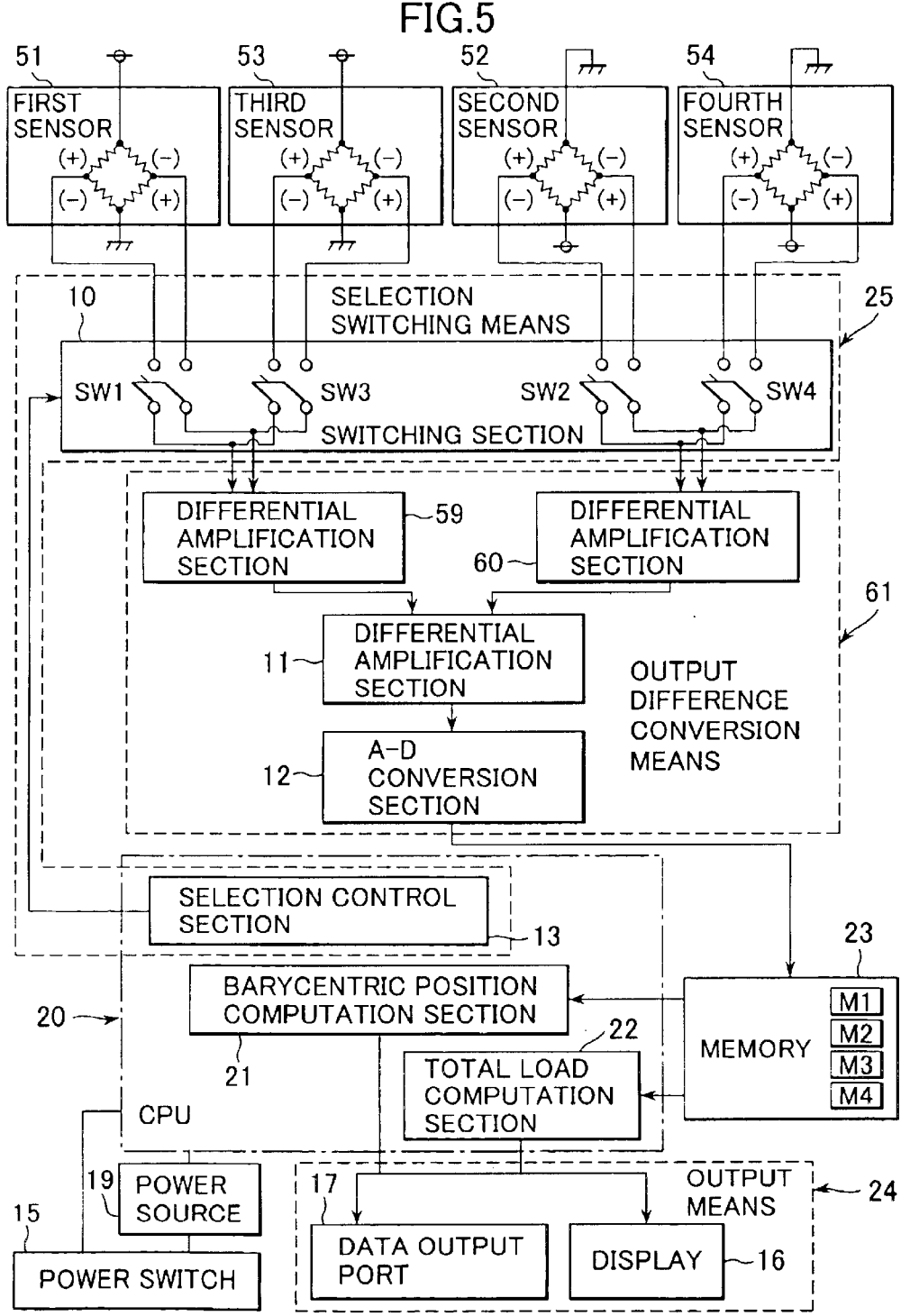
FIG. 5 is a block diagram showing the sections of another electrical system.

Another example of the constitution in this case is shown in the block diagram of FIG. 5. In place of the four sensors (first sensor 5, second sensor 6, third sensor 7 and fourth sensor 8) in FIG. 1 which have a half-bridge strain gauge as a load-electricity conversion device, four sensors (first sensor 51, second sensor 52, third sensor 53 and fourth sensor 54) having a full-bridge strain gauge as a load-electricity conversion device are provided before a switching section 10. Further, in output difference conversion means 14, differential amplification sections 59 and 60 which differential-amplify outputs from the sensors are provided after the switching section 10. Output conversion means 61 in this case includes these differential amplification sections 59 and 60.

Of the four sensors (first sensor 51, second sensor 52, third sensor 53 and fourth sensor 54) having a full-bridge strain gauge as a load-electricity conversion device, two sensors (first sensor 51 and third sensor 53) which are positioned at opposing corners convert a positive load passed from a load receiving board 4 into an electrical positive output when the board 4 receives the load (i.e., the positive load is applied to the board 4). Meanwhile, the remaining two sensors (second sensor 52 and fourth sensor 54) which are positioned at opposing corners convert a positive load passed from the load receiving board 4 into an electrical negative output when the board 4 receives the load (i.e., the positive load is applied to the board 4). Then, the outputs from the sensors are combined in the switching section 10 and differential-amplified in the differential amplification sections 59 and 60. Then, the same operations as those in FIG. 1 are performed.

Further, although the four sensors are placed near the four corners of the load receiving board 4 in the above embodiment, their positions are not limited to this. They may be placed in any four directions as long as a load is passed from the load receiving board 4 to the sensors.

Further, in addition to a barycenter fluctuation meter, the barycentric position measuring apparatus of the present invention is also applicable to apparatuses such as a hit-position assessing apparatus which assesses a position where a ball hits on a load receiving board.

As described above, the barycentric position measuring apparatus of the present invention is constituted by the load receiving board, four sensors, selection switching means, output difference conversion means, memory, barycentric position computation section and output means as described above. Therefore, the outputs of a load applied to the load receiving board can be rendered large without use of special components, and the influence of changes in outputs from the sensors which are caused by the displacement of the barycentric position of the load applied to the load receiving board can be reduced. Consequently, the barycentric position measuring apparatus of the present invention can be provided as an inexpensive barycentric position measuring apparatus which measures a barycentric position accurately.

What is claimed is:

1. A barycentric position measuring apparatus comprising:
   a load receiving board,
   a first sensor and a third sensor,
   a second sensor and a fourth sensor,
   selection switching means,
   output difference conversion means,
   a memory,
   a barycentric position computation section, and
   output means,
   wherein
   the load receiving board receives a load,
   the first sensor and the third sensor are disposed at opposing two corners out of the four corners of the load receiving board so that the load is passed from the load receiving board and output a positive output, the second sensor and the fourth sensor are disposed at the other opposing two corners out of the four corners of the load receiving board so that the load is passed from the load receiving board and output a negative output, the selection switching means selects and switches a combination of the positive output from the first sensor and the negative output from the second sensor, a combination of the negative output from the second sensor and the positive output from the third sensor, a combination of the positive output from the third sensor and the negative output from the fourth sensor, and a combination of the negative output from the fourth sensor and the positive output from the first sensor, the output difference conversion means determines the output differences of all the combinations selected and switched by the selection switching means, the memory stores the output differences determined by the output difference conversion means, the barycentric position computation section determines a first directional position based on a comparison of the data stored in the memory, i.e., a comparison of the output difference between the positive output from the first sensor and the negative output from the second sensor with the output difference between the positive output from the third sensor and the negative output from the fourth sensor and also determines a second directional position orthogonal to the first directional position based on a comparison of the data stored in the memory, i.e., a comparison of the output difference between the negative output from the second sensor and the positive output from the third sensor with the output difference between the negative output from the fourth sensor and the positive output from the first sensor, and the output means outputs the first directional position and second directional position determined by the barycentric position computation section.

2. The apparatus of claim 1, wherein the selection switching means selects and switches a combination of the positive output from the first sensor and the negative output from the second sensor, a combination of the negative output from the second sensor and the positive output from the third sensor, a combination of the positive output from the third sensor and the negative output from the fourth sensor, and a combination of the negative output from the fourth sensor and the positive output from the first sensor in turn.

3. The apparatus of claim 1, wherein the selection switching means selects and switches a combination of the positive output from the first sensor and the negative output from the second sensor, a combination of the positive output from the third sensor and the negative output from the fourth sensor, a combination of the negative output from the second sensor and the positive output from the third sensor, and a combination of the negative output from the fourth sensor and the positive output from the first sensor in turn.

4. The apparatus of any one of claims 1 to 3, wherein the barycentric position computation section computes a barycentric position (Gx, Gy) with respect to the x and y coordinate axes by substituting:

(x1, y1) which is the position of the first sensor with respect to the x and y coordinate axes, (x2, y2) which is the position of the second sensor with respect to the x and y coordinate axes, (x3, y3) which is the position of the third sensor with respect to the x and y coordinate axes, (x4, y4) which is the position of the fourth sensor with respect to the x and y coordinate axes, wM1 which is the output difference between the positive output from the first sensor and the negative output from the second sensor, wM2 which is the output difference between the negative output from the second sensor and the positive output from the third sensor, wM3 which is the output difference between the positive output from the third sensor and the negative output from the fourth sensor, and wM4 which is the output difference between the negative output from the fourth sensor and the positive output from the first sensor, into the following expressions 1 and 2

$$Gx=[\{(x2+x3)/2\} \times wM2 - \{(x1+x4)/2\} \times wM4]/(wM2+wM4) \quad (1)$$

$$Gx=[\{(y1+y2)/2\} \times wM1 - \{(y3+y4)/2\} \times wM3]/(wM1+wM3) \quad (2).$$

5. The apparatus of claim 1, further comprising a total load computation section which totals all the output differences stored in the memory so as to determine a total load.

6. The apparatus of claim 2, further comprising a total load computation section which totals all the output differences stored in the memory so as to determine a total load.

7. The apparatus of claim 3, further comprising a total load computation section which totals all the output differences stored in the memory so as to determine a total load.

8. The apparatus of claim 4, further comprising a total load computation section which totals all the output differences stored in the memory so as to determine a total load.

* * * * *